United States Patent [19]

Chaussade et al.

[11] Patent Number: 5,227,241
[45] Date of Patent: Jul. 13, 1993

[54] LAMINATED GLASS

[75] Inventors: Pierre Chaussade, Sully S/Loire; Yves Naoumenko, Les Bordes, both of France

[73] Assignee: Saint-Gobain Vitrage International, Courbevoie, France

[21] Appl. No.: 865,478

[22] Filed: Apr. 9, 1992

[30] Foreign Application Priority Data

Apr. 9, 1991 [FR] France ............... 91 04287

[51] Int. Cl.⁵ .............................. B32B 99/00
[52] U.S. Cl. .................... 428/437; 428/212; 428/215; 428/217; 428/426; 428/430; 428/501; 524/314; 524/287; 524/308
[58] Field of Search .......... 428/437, 212, 430, 426, 428/501, 217

[56] References Cited

U.S. PATENT DOCUMENTS

| | | | |
|---|---|---|---|
| 2,526,728 | 10/1950 | Burk et al. | 428/335 |
| 3,178,334 | 4/1965 | Bragaw, Jr. et al. | 428/215 |
| 3,437,552 | 4/1969 | Bowen | 428/214 |
| 4,130,684 | 12/1978 | Littell, Jr. et al. | 428/212 |
| 4,287,107 | 9/1981 | Hermann et al. | 428/437 |
| 4,390,594 | 6/1983 | Dages | 428/437 |
| 5,013,779 | 5/1991 | Fariss et al. | 428/437 |

FOREIGN PATENT DOCUMENTS

| | | |
|---|---|---|
| 0054466 | 6/1982 | European Pat. Off. . |
| 2332915 | 5/1974 | Fed. Rep. of Germany . |
| 1317551 | 1/1963 | France . |
| 977640 | 12/1964 | United Kingdom . |

OTHER PUBLICATIONS

Search Report Dated Jan. 24, 1992 From French Patent Office on the Corresponding French Patent Application Ser. No. 9104287.

*Primary Examiner*—Patrick J. Ryan
*Assistant Examiner*—Abraham Bahta
*Attorney, Agent, or Firm*—Oblon, Spivak, McClelland, Maier & Neustadt

[57] ABSTRACT

The present invention relates to a laminated glass, more specifically to an airplane windshield. The present laminated glass offers excellent resistance to breakage, and particularly, to cleavage of the sheets of glass from plastic layer(s) laminated therewith.

16 Claims, 1 Drawing Sheet

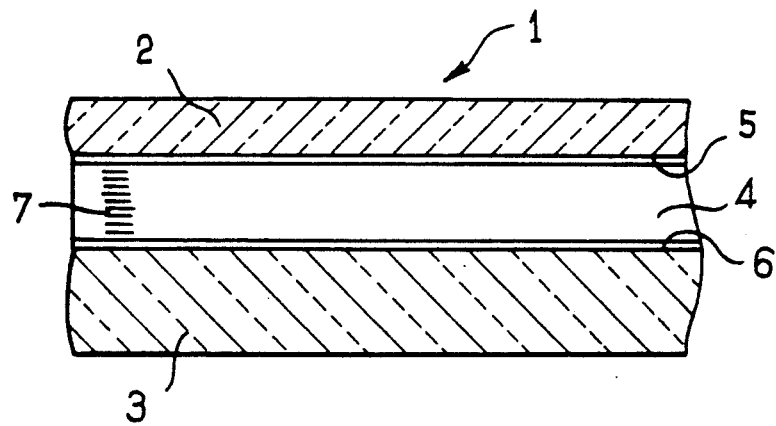
FIG_1
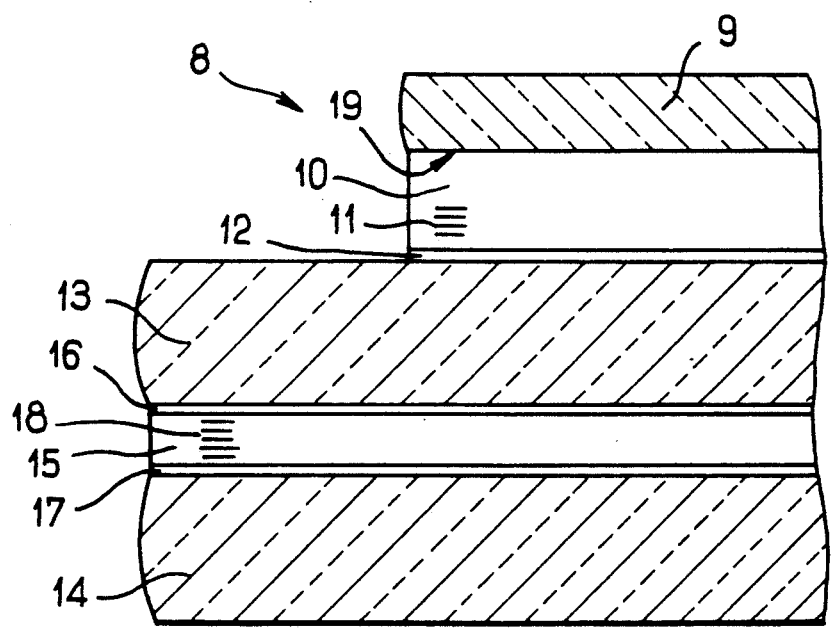
FIG_2
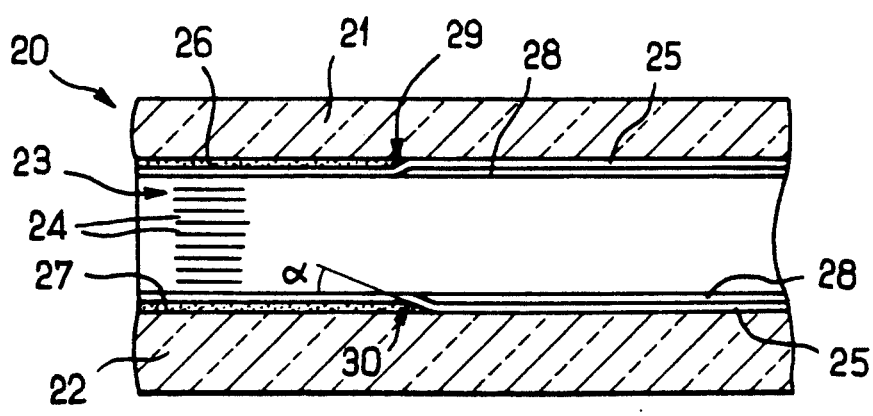
FIG_3

LAMINATED GLASS

BACKGROUND OF THE INVENTION

1. Field of the Invention

The present invention concerns a laminated glass for a transportation vehicle, in particular, a laminated glass for an airplane, and specifically, a laminated windshield for an airplane.

2. Discussion of the Background

In aircraft, laminated glass generally comprises at least two sheets of thermally or chemically tempered glass having a thermoplastic polymer insert layer. The insert layer used typically consists of several plies or layers of plasticized polyvinyl butyral (hereinafter designated as PVB). PVB has a high modulus of tension and a considerable breaking stretch (percent elongation at break). Furthermore, PVB acts as an energy absorber, and can assure the tightness and integrity of a laminated glass in which all the glass sheets are broken.

Under the usual conditions of a high-altitude flight, such a laminated glass is subjected to substantial differences in pressure and in temperature between its two surfaces (i.e., the surface facing inside the aircraft and the surface facing the external atmosphere). PVB has a thermal expansion coefficient well above that of the glass sheets. Consequently, the piece of glass is subjected to substantial shearing stresses, principally at the edges of the glass. These high stresses may be further increased when the glass is struck, particularly at low temperature (for example, when the windshield of the airplane in flight strikes a bird). At temperatures of less than 0° C., PVB offers a greatly increased modulus of tension to aid in withstanding such impacts.

The problem associated with stresses is still more pronounced when the insert contains, countersunk in its edges, a peripheral band of metal or a stratified material. The metal or stratified material increases the rigidity of the glass, and thus permitting or facilitating, as the case may be, installation of the glass in the opening in the body of the cockpit, by bolting for example.

Solutions have been proposed to reduce the stresses cited above, and consequently to lessen the risks of glass failure. One of the proffered solutions consists of applying a material acting as a separator in the marginal area of the glass. This solution may be suitable for pieces of glass of small dimensions. It generally is not satisfactory, however, for pieces of glass the size of an airplane windshield. Furthermore, the separator materials may promote the penetration of moisture in the PVB insert, leading to losses in adhesion in undesirable places, as well as losses in the optical qualities, particularly the transparency, of the glass. In addition, the separator materials suggested to date do not have the optical quality of the typical materials used in laminated glass. Thus, use of such separator materials reduces the field of vision of the glass.

It also has been suggested in French Patent Publication FR-A-2,310,979 to place a continuous film of polyurethane between the PVB layer and the sheet of glass. The polyurethane film deflects or diminishes the shear forces on the glass sheets and polyurethane interlayers, thus reducing the adverse effects of thermally-induced contraction and stresses on the PVB.

This solution also has drawbacks. It generally requires an adhesion-activating process for the polyurethane over the entirety of its contact surface with the glass. Furthermore, the supplementary interface between the two different thermoplastic products (PVB and polyurethane) may lead to optical defects in the glass, because each of these polymeric materials have different indexes of refraction. Even further, thermal stresses may lead to a cleavage of chemically tempered sheets of glass from the thermoplastic polymer inserts, in the plane parallel to the contact surface with the glass.

SUMMARY OF THE INVENTION

Accordingly, one object of the present invention is to provide a novel structure for laminated glass which retains superior mechanical and optical properties under the widely varying conditions of temperature and pressure to which an airplane glass may be subject.

It is a further object of the present invention to provide a novel laminated glass which has high durability under the widely varying conditions of temperature and pressure to which an airplane glass may be subject.

It is a further object of the present invention to provide a novel laminated glass which has strong adhesion between the various layers therein.

These and other objects will become apparent in the following detailed description, are provided by a laminated glass comprising a first sheet of glass having a length and a width, a polyvinyl butyral (PVB) insert layered thereon having a length and a width, wherein said polyvinyl butyral insert comprises a first surface PVB layer attached to said first sheet of glass, a first inner PVB layer attached to said first PVB layer, and a second surface PVB layer attached to said inner PVB layer, each of said PVB layers comprising a PVB resin and a plasticizer, one of said first and second surface PVB layers containing said plasticizer in a proportion by weight higher than the proportion by weight of plasticizer in said first inner PVB layer, the ratio of said proportion of said plasticizer of said one of said first and second surface PVB layers and said proportion of said plasticizer of said first inner layer being from 1.2:1 to 3:1, said length of said polyvinyl butyral insert being not greater than said length of said first sheet of glass and said width of said polyvinyl butyral insert being not greater than said width of said first sheet of glass, and a second sheet of glass having a length not greater than said length of said first sheet of glass and a width not greater than said width of said first sheet of glass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view of an embodiment of the laminated glass pursuant to the present invention;

FIG. 2 is a cross-sectional view of a second embodiment of the laminated glass pursuant to the present invention;

FIG. 3 is a cross-sectional view of a third embodiment of the laminated glass pursuant to the present invention.

DETAILED DESCRIPTION OF THE PREFERRED EMBODIMENTS

Referring now to the drawings, wherein like reference numerals designate identical or corresponding parts throughout the several views and more particularly to FIG. 1 thereof, wherein the laminated glass 1 in accordance with the present invention comprises at least first and second sheets of glass 2 and 3 and a polyvinyl butyral (PVB) insert 4 which does not extend beyond the periphery of the largest-size sheet of glass. That is, if the surface area (length × width) of the first sheet of glass is equal to or greater than the surface area of the second sheet of glass, the length of the polyvinyl butyral insert is not greater than the length of the first sheet of glass and the width of he polyvinyl butyral insert is not greater than the width of the first sheet of glass.

PVB insert 4 also has in at least one of the two surface layers 5 and 6 (the first and second surface PVB layers) at the contact surface with the glass sheets 2 and 3, a proportion of plasticizer higher than in the inner layer 7 of the insert. In accordance with one of the preferred aspects of the present laminated glass, both of the two surface (or outer) layers 5 and 6 of the thermoplastic polymeric insert surfaces of contact with the glass sheets have a proportion of plasticizer higher than that of the inner layer. Paricularly preferably, the proportion of plasticizer in surface PVB layer 5 is equal to the proportion of plasticizer in surface PVB layer 6.

The plasticizer content affects certain mechanical properties of the plasticized PVB, and particularly affects the modulus of elasticity. Generally, the higher the proportion of plasticizer, the lower the modulus of elasticity. By way of example, a PVB having a plasticizer proportion of 40 parts by weight per 100 parts by weight of PVB resin has a modulus of elasticity at 0° C. of about 60 MPa, while a PVB having a plasticizer proportion of 20 parts by weight per 100 parts by weight of PVB resin has a modulus of elasticity at 0° C. of about 120 MPa.

In accordance with one aspect of the present laminated glass, at least one of the first and second surface PVB layers of the PVB insert has a plasticizer content of from 30 to 45 parts by weight of plasticizer and preferably of from 35 to 42 parts by weight of plasticizer per 100 parts by weight of PVB, and the inner PVB layer has a plasticizer content of from 15 to 25 parts by weight of plasticizer and preferably of from 17 to 22 parts by weight of plasticizer per 100 parts by weight of PVB. Preferably, both outer layers of the PVB insert have a plasticizer content of from 30 to 45 parts by weight and particularly preferably of from 35 to 42 parts by weight of plasticizer per 100 parts by weight of PVB.

In a preferred embodiment of the present invention, the insert comprises more than three layers, and the proportion of plasticizer in the PVB of the layered insert decreases regularly by levels, starting from the outermost layers containing the glass going to the medium layer. Preferably, the PVB insert further comprises a second inner PVB layer between the first surface PVB layer and the first inner PVB layer, and a third inner PVB layer between the first inner PVB layer and the second surface PVB layer, the proportion of plasticizer in the second inner PVB layer being between the proportion of plasticizer in the first surface PVB layer and the proportion of plasticizer in the first inner PVB layer, and the proportion of plasticizer in the third inner PVB layer being between the proportion of plasticizer in the second surface PVB layer and the proportion of plasticizer in the first inner PVB layer. For each additional inner PVB layer, the proportion of plasticizer will be less than the proportion of plasticizer in the layer attached thereto nearer to the nearest surface layer, but more than the proportion of plasticizer in the layer attached thereto nearer to the first inner PVB layer; i.e., the proportion of plasticizer in each additional inner PVB layer (e.g., the fourth, fifth, sixth, seventh, etc., inner layers) will be between the proportions in each of the PVB layers attached thereto. Naturally, the first inner layer will have the lowest proportion of plasticizer of all the layers of the PVB insert.

In another embodiment of the present laminated glass, the insert comprises three layers of PVB, and only two plasticizer proportions are used for the PVB of the layered insert: a relatively high proportion for at least one of the two, preferably both, outer layers and a lower proportion for the inner layer.

The ratio of (A) the thickness of a surface layer, having a high proportion of plasticizer, to (B) the thickness of an inner layer, having a lower proportion of plasticizer, may vary widely and specifically in accordance with (1) the size of the glass; (2) its use, for example, as an airplane windshield; and/or (3) the number of plies or layers which it comprises in total. For example, in an airplane windshield, the ratio of the thickness of the layers of PVB with high proportions of plasticizer (one or both outermost layers) to the thickness of the each layer of PVB with lower proportions of plasticizer (one or more inner layers) for the same insert may be from 0.05:1 to 1:1.

Plasticized PVB is obtained by mixing the PVB resin with the plasticizer. Suitable plasticizers are those conventionally known for PVB; for example, dialkyl adipates, such as di($C_1$–$C_6$)esters of adipic acid (e.g., dimethyl adipate, diethyl adipate, dipropyl adipate, diisopropyl adipate, dibutyl adipate, di-t-butyl adipate, dihexyl adipate, etc.), and di($C_7$–$C_{16}$)esters of adipic acid (e.g., diheptyl adipate, dioctyl adipate, didecyl adipate, didodecyl adipate, ditetradecyl adipate, dipalmityl adipate, etc.); mixed ($C_1$–$C_{16}$)esters of adipates (e.g., methyl ethyl adipate, ethyl butyl adipate, methyl octyl adipate, ethyl isopropyl adipate, butyl 3,3-dimethylbutyl adipate, methyl t-butyl adipate, methyl hexyl adipate, ethyl dodecyl adipate, octyl palmityl adipate, etc.); alkyl aryl adipates (e.g., methyl phenyl adipate, methyl naphthyl adipate, methyl 4-nitrophenyl adipate, methyl 2,4-dichlorophenyl adipate, ethyl phenyl adipate, butyl phenyl adipate, ethyl tolyl adipate, octyl phenyl adipate, palmityl phenyl adipate, etc.); carboxylic acid esters of glycols, such as di($C_1$–$C_6$)carboxylic acid esters of ethylene glycol, di($C_7$–$C_{16}$)carboxylic acid esters of ethylene glycol, mixed ($C_1$–$C_{16}$)carboxylic acid esters of ethylene glycol, di- or mixed ($C_1$–$C_{16}$)carboxylic acid esters of propylene glycol, etc.; or mixtures of these products.

The two sheets of glass to be used in the present invention advantageously are chemically tempered sheets of glass; that is, sheets of glass having undergone a chemical strengthening or toughening treatment known in the art as tempering. This treatment consists, for example, in an exchange of ions in the surface layers of the glass, the small-size ions (such as lithium, titanium, boron, zirconium, aluminum, etc.) being replaced by larger-size ions (such as sodium, potassium, rubidium, cesium, lead, chromium, cerium, lanthanides and actinides, transition metals of the fourth and fifth rows of the periodic table, gallium, germanium, antimony, arsenic, etc.), by techniques known to the skilled artisan.

A sheet of chemically tempered glass generally has compression layers of thicknesses less than corresponding compression layers in thermally tempered sheets of glass. Compression layers in tempered glass may break under certain conditions as a result of cleavage of the glass from the thermoplastic polymer insert. The structure of the present laminated glass eliminates this problem.

The glass pursuant to the present invention has three primary properties of improved resistance to various stresses, specifically to which airplane glass is subject at high altitude. These properties may be improved further, if need be, by combining the present layered plasticized PVB with separator elements in marginal areas of the glass. The "marginal areas" of the laminated glass are defined herein as those areas of the laminated glass structure nearest to and within a certain distance from the border defined by the lengthwise and widthwise edges or borders of the laminated glass. For example, FIG. 3 shows an embodiment of the present laminated glass 20, formed of an outer sheet of chemically tempered glass 21 and an inner sheet of chemically tempered glass 22, between which is positioned an insert 23 formed of inner layers of plasticized PVB 24 and outer layers of plasticized PVB 25 along the contact surface of each of the two sheets of glass. In the marginal areas (along the periphery) of the glass, the layers 25 overlap two polyurethane rings 26 and 27, used as separator materials. To compensate for the extra thickness due to the rings, the outermost inner PVB layer 28 has length and width dimensions reduced by the distance corresponding to the width of the ring.

Preferably, the marginal areas of the present laminated glass structure are within 20 cm of the edge, preferably within 15 cm and particularly preferably within 10 cm of the edge. Preferably, the layers of the present laminated glass are combined such that at least one ring is positioned between the insert and a sheet of glass in the marginal areas of the glass. The ring preferably has adhesive properties with the insert and with the glass, and is preferably formed of a plastic material having stretch properties superior to those of the inner layer of the insert, as well as a lower modulus of shearing (shear modulus).

The plastic material forming the ring may be selected from the silicones and elastomers, which may optionally be thermally hardened. Particularly preferred plastic ring materials include thermoplastic elastomers, which may optionally be thermally hardened, and particularly preferred materials are thermoplastic polyurethanes. The polyurethane forming the rings is, for example, an elastomer which may be thermally hardened, obtained by injection or casting.

These plastic materials which may be used for the ring have a breaking stretch (percent elongation at break) between 200 and 700%, and preferably, between 300 and 600%. The plastic ring materials also have a modulus of shearing (shear modulus) between 1 and 100 MPa, and preferably, between 10 and 80 MPa, these values being the values measured at temperatures between approximately −30° C. and approximately 40° C.

The thickness of the ring is preferably between 5 and 15% of the thickness of the entire layered PVB insert separating the two sheets of glass. The ring preferably is overlapped by the surface layer of PVB. In the marginal areas of the laminated glass, the ring may replace one or several inner layers of PVB.

Preferably, the width of the present ring is 20 cm or less, preferably ≦15 cm and particularly preferably from 15 to 100 mm. This width also depends on the dimensions of the glass, and may vary, depending on the shape and size of the glass. The width of the ring generally is between 2 and 15% of the width or length of the largest piece of glass in the laminated structure. The width of the ring may vary along the circumference of the laminated glass, in accordance with the form and dimensions of the laminated glass, preferably within the dimensions of the ring and marginal areas described above.

To avoid stresses at the inner edge of the ring, the thickness of the ring may increase progressively from the inner edge of the ring to the edge of the laminated glass. When the ring itself comprises several layers, similar to the insert, the structure of the edge may be a "flight-of-stairs" structure, the height of each stair corresponding to the thickness of each layer. Preferably, the thickness of each layer is ≦0.5 mm, particularly preferably from 0.05 to 0.5 mm. When the ring is formed of a single layer, the inner edge structure may have a chamfer, or slanted, form. The angle of inclination of the line of descent of the edge preferably is less than 45°, preferably from 5° to 40°, particularly preferably from 10° to 30°.

Other features of the invention will become apparent in the course of the following descriptions of exemplary embodiments which are given for illustration of the invention, and are not intended to be limiting thereof.

EXAMPLE 1

FIG. 1 represents a piece of laminated glass 1 pursuant to the present invention, formed of an outer sheet of chemically tempered glass 2 having a thickness of 4 mm, and an inner sheet of chemically tempered glass 3 having a thickness of 6 mm, between which is positioned a layered insert 4 formed of 7 plies of PVB. The two outer plies 5 and 6 at the contact surfaces of the sheets of glass 2 and 3 have a thickness of 0.76 mm and are formed of PVB with a high proportion of plasticizer. In this example, outer layers 5 and 6 contain 37.5 parts by weight of di-n-hexyl adipate per 100 parts by weight of PVB. The five inner layers of PVB 7, each 0.5 mm in thickness, are formed of PVB with a lower proportion of plasticizer; in this example, 19.5 parts by weight of di-n-hexyl adipate per 100 parts by weight of PVB resin.

The laminated glass of FIG. 1 having the structure and composition described above resists breakage due to impacts, even at low temperature. For example, at −20° C. the laminated glass of this example resisted a bird impact force. (The "bird impact force" is known in the aircraft manufacturing art.) This laminated glass shows no layer delamination, glass scaling or cleavage. Its transparency is perfect.

EXAMPLE 2

In FIG. 2, the laminated glass 8 comprises a thermally semi-tempered sheet of glass 9 with a thickness of 4 mm, a first insert 10 formed of nine layers of plasticized PVB each having a thickness of 0.5 mm and containing 19.5 parts of plasticizer (dihexyl adipate) by weight per 100 parts by weight of PVB resin, and one plasticized PVB surface layer 12 having a thickness of 0.76 mm, containing 39 parts of dihexyl adipate by weight per 100 parts by weight of PVB resin. The PVB layer 12 lies at the contact surface of a second chemically tempered sheet of glass 13 having a thickness of 8 mm. (A second similar surface layer of PVB having a high proportion of plasticizer may alternatively be provided between the sheet of glass 9 and the plies 11 of the insert.) Between this second sheet of glass 13 and a third sheet of chemically tempered glass 14 is positioned a second layered PVB insert 15 comprising two outer plies 16 and 17 at the contact surfaces of the sheets of glass 13 and 14, outer plies 16 and 17 having a thickness of 0.76 mm and containing 39 parts of dihexyl adipate by weight per 100 parts by weight of PVB resin, and 6 inner plasticized PVB plies 18, each having a thickness of 0.5 mm, containing 19.5 parts of dihexyl adipate by weight per 100 parts by weight of PVB resin.

The outer sheet of glass 9 may include a further layer providing heating resistance, for example, in the form of a conventional conductive heating layer 19 known in the art.

The laminated glass described in Example 2 above satisfies the aircraft manufacturer's qualifying tests (bird impact test, ultimate pressure test, and "fail safe" test) for a windshield for a large-capacity airplane (for example, the tests of AIRBUS for the AIRBUS A 320). In particular, it fully resists bird impact without breaking, and the laminated glass specifically resists cleavage of the chemically tempered sheets of glass along the surfaces with outer plasticized PVB layers 13, 16 and 17.

EXAMPLE 3

FIG. 3 represents an embodiment of the present laminated glass 20 formed of two sheets of chemically tempered glass, an outer sheet of glass 21 and an inner sheet of glass 22, between which is positioned an insert 23 formed of 10 inner plies of plasticized PVB 24 containing 19.5 parts of dihexyl adipate by weight per 100 parts by weight of PVB resin and having a thickness of 0.5 mm, and one surface layer of plasticized PVB 25 containing 39 parts of dihexyl adipate by weight per 100 parts by weight of PVB resin along the contact surface of each of the two sheets of glass. At the periphery of the glass, these plies 25 overlap two polyurethane rings 26 and 27 each having a thickness of 0.5 mm. To compensate for the extra thickness due to the rings, the first inner ply 28 of plasticized PVB has both its length and width dimensions reduced by an amount corresponding to the width of the ring. The polyurethane is thermoplastic, and has a breaking stretch (elongation at break) of 350%, and a modulus of shearing of 60 MPa (measured at a temperature of −30° C.). The width of the polyurethane ring is 20 mm, and the length and width of the glass are each approximately 500 mm. The inner edges 29 and 30 of the rings have a chamfer form, and the angle of inclination is about 20°. This progressive reduction in the thickness of the ring achieved by the chamfered inner edge avoids any risk of optical distortion and achieves a better glass-polyurethane-PVB bonding than a straight inner edge.

The polyurethane rings 26 and 27 adhere to both the glass and to the PVB layers 25, 24 and 28. The adhesion value was measured in accordance with the peeling test described below.

Adhesion values are measured on test pieces of glass dimensions 8×8 cm, coated with a layer obtained from the polyurethane forming the ring. A strip 1 cm in width is cut in the polyurethane covering layer, and a section of the strip 3 cm in length the strip is loosened. The 3×1 cm loosened section of the strip is pulled perpendicularly to the surface of the glass at a rate of 2 cm/min. The force required for peeling is measured. The adhesion value of the polyurethane covering layer was determined to be 15 daN/cm (daN=decaNewton; 1 daN=10 N).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of United States is:

1. A laminated glass, comprising
   i) a first sheet of glass having a length and a width;
   ii) a polyvinyl butyral (PVB) insert layered thereon having a length not greater than said length of said first sheet of glass and a width not greater than said width of said first sheet of glass, wherein said PVB insert comprises
      a) a first surface PVB layer attached to said first sheet of glass;
      b) a first inner PVB layer attached to said first surface PVB layer; and
      c) a second surface PVB layer attached to said first inner PVB layer; and
   iii) a second sheet of glass having a length not greater than said length of said first sheet of glass and a width not greater than said width of said first sheet of glass;
   wherein each PVB layer comprises a PVB resin and a plasticizer, wherein the ratio of the proportion of said plasticizer of said at least one of said first and second surface PVB layers and said proportion of said plasticizer of said first inner PVB layer being from 1.2:1 to 3:1;
   wherein said proportion of said plasticizer of said first inner layer is from 15 to 25 parts by weight of plasticizer per 100 parts by weight of PVB resin.

2. The laminated glass of claim 1, wherein said first and second sheets of glass are chemically tempered.

3. The laminated glass of claim 1, wherein said proportion of said plasticizer in said one of said first and second surface PVB layers is from 30 to 45 parts by weight per 100 parts by weight of PVB resin, and said proportion of said plasticizer of said inner layer is from 15 to 25 parts by weight of plasticizer per 100 parts by weight of PVB resin.

4. The laminated glass of claim 1, wherein second surface PVB layer contains said plasticizer in a proportion higher than the proportion of plasticizer in said first inner PVB layer, the ratio of said proportion of said plasticizer of said second surface PVB layer and said proportion of said plasticizer of said first inner layer being from 1.2:1 to 3:1.

5. The laminated glass of claim 4, wherein said proportion of plasticizer in said first surface PVB layer is equal to said proportion of plasticizer in said second surface PVB layer.

6. The laminated glass of claim 4, wherein said PVB insert further comprises a second inner PVB layer between said first surface PVB layer and said first inner PVB layer, and a third inner PVB layer between said first inner PVB layer and said second surface PVB layer, the proportion of plasticizer in said second inner PVB layer being between said proportion of plasticizer in said first surface PVB layer and said proportion of plasticizer in said first inner PVB layer, and the proportion of plasticizer in said third inner PVB layer being between said proportion of plasticizer in said second surface PVB layer and said proportion of plasticizer in said first inner PVB layer.

7. The laminated glass of claim 3, wherein said proportion of plasticizer in said first and second surface PVB layers is from 35 to 42 parts by weight of plasticizer per 100 parts by weight of PVB resin, and said proportion of plasticizer in said first inner PVB layer is from 17 to 22 parts by weight of plasticizer per 100 parts by weight of PVB resin.

8. The laminated glass of claim 4, wherein each of said first and second surface PVB layers and said first inner PVB layer have a thickness, the ratio of said thickness of each of said first and second surface PVB layers and said first inner PVB layer being from 0.05:1 to 1:1.

9. The laminated glass of claim 1, further comprising a second PVB insert layered on said second sheet of glass, wherein said second PVB insert comprises a third surface PVB layer attached to said second sheet of glass, and a fourth inner PVB layer attached to said third surface PVB layer, each of said third surface PVB layer and fourth inner PVB layer comprising a PVB resin and a plasticizer, said third surface PVB layer containing said plasticizer in a proportion higher than the proportion of plasticizer in said fourth inner PVB layer, the ratio of said proportion of said plasticizer of said third surface PVB layer and said proportion of said plasticizer of said fourth inner PVB layer being from 1.2:1 to 3:1, said length of said second PVB insert being not greater than said length of said first sheet of glass and said width of said second PVB insert being not greater than said width of said first sheet of glass, and
a third sheet of glass having a length not greater than said length of said first sheet of glass and a width not greater than said width of said first sheet of glass.

10. The laminated glass of claim 1, wherein said plasticizer is selected from the group consisting of dialkyl adipates, mixed alkyl adipates, alkyl aryl adipates, carboxylic acid esters of glycols, and mixtures thereof.

11. The laminated glass of claim 10, wherein said plasticizer is selected from the group consisting of di($C_1$-$C_6$)esters of adipic acid, di($C_7$-$C_{16}$)esters of adipic acid, mixed ($C_1$-$C_{16}$)esters of adipic acid, alkyl aryl adipates, di($C_1$-$C_6$)carboxylic acid esters of ethylene glycol, di($C_7$-$C_{16}$)carboxylic acid esters of ethylene glycol, mixed ($C_1$-$C_{16}$)carboxylic acid esters of ethylene glycol, di- or mixed ($C_1$-$C_{16}$)carboxylic acid esters of propylene glycol, and mixtures thereof.

12. The laminated glass of claim 1, further comprising at least one ring of a plastic material in marginal areas of said glass, said ring being interposed between said first inner PVB layer and either of said first surface PVB layer or said second surface PVB layer, said ring having a lower shear modulus and a superior elongation at break than said first inner PVB layer.

13. The laminated glass of claim 12, wherein either of said first surface PVB layer or said second surface PVB layer overlaps said ring in said marginal areas of said glass.

14. The laminated glass of claim 12, wherein said ring has a width of $\leq 20$ cm.

15. The laminated glass of claim 12, wherein said ring comprises a thermoplastic polyurethane.

16. The laminated glass of claim 12, wherein said ring has a chamfered inner edge.

* * * * *